M. OEHLER.
MEAT CHOPPER.
APPLICATION FILED OCT. 21, 1920.
1,368,964.
Patented Feb. 15, 1921.
2 SHEETS—SHEET 1.
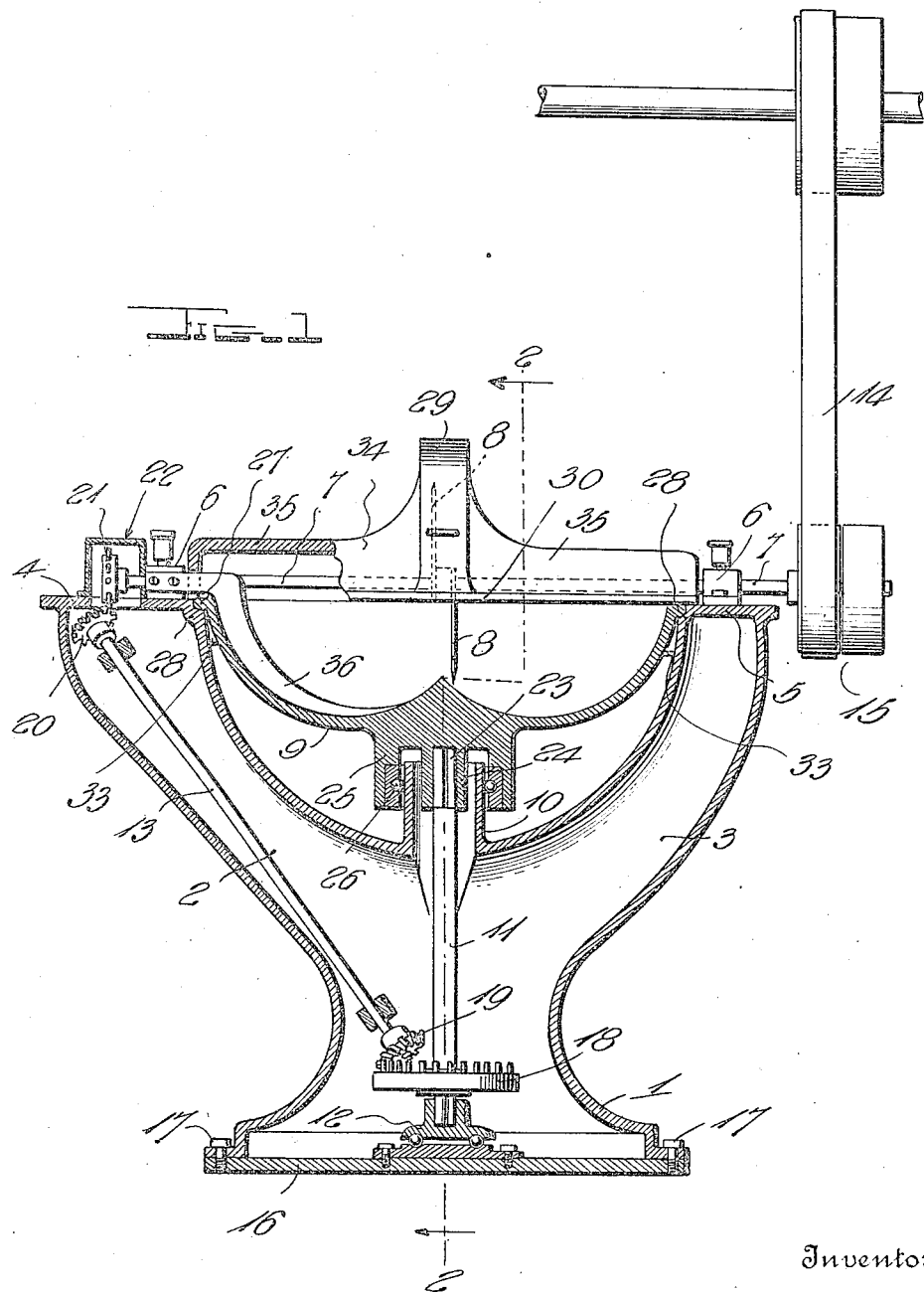
Inventor
M. Oehler
By H. B. Willson & Co.
Attorneys M. OEHLER.
MEAT CHOPPER.
APPLICATION FILED OCT. 21, 1920.
1,368,964.
Patented Feb. 15, 1921.
2 SHEETS—SHEET 2.
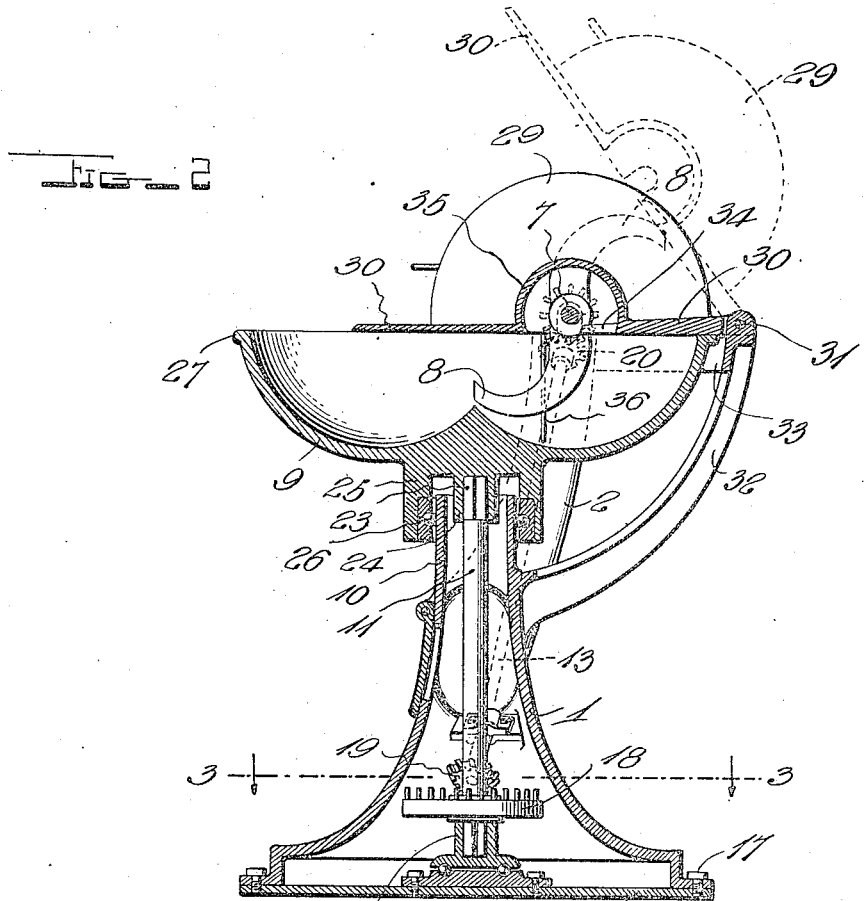
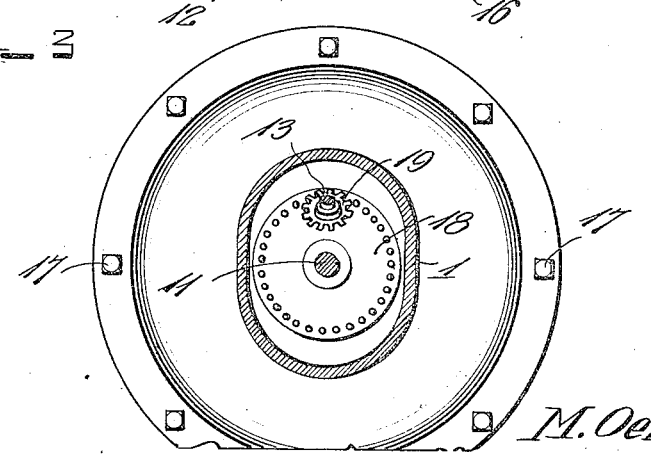
Inventor
M. Oehler
By [signature]
Attorneys

UNITED STATES PATENT OFFICE.

MAX OEHLER, OF BELLEVUE, IDAHO.

MEAT-CHOPPER.

1,368,964.     Specification of Letters Patent.     Patented Feb. 15, 1921.

Application filed October 21, 1920. Serial No. 418,350.

*To all whom it may concern:*

Be it known that I, MAX OEHLER, a citizen of the United States, residing at Bellevue, in the county of Blaine and State of Idaho, have invented certain new and useful Improvements in Meat-Choppers; and I do declare the following to be a full, clear, and exact description of the invention, such as will enable others skilled in the art to which it appertains to make and use the same.

My invention relates to improvements in meat choppers of the type employing a rotating meat bowl and a rotary chopper operating in said bowl, and the principal object of the invention is to provide a novel form of base for supporting the bowl and the chopper, said base being of hollow construction and containing the shafts for rotating the bowl and driving the chopper shaft. By this arrangement, not only are several of the operating parts so shielded as to prevent any possible injury to the operator, but the hollow base is adapted to contain oil for lubricating these parts.

With the foregoing and minor objects in view, the invention resides in the novel construction and arrangement of parts hereinafter described and claimed, the descriptive matter being supplemented by the accompanying drawing.

Figure 1 is a vertical longitudinal section of a meat chopper constructed in accordance with my invention, parts being in elevation.

Fig. 2 is a vertical transverse section as indicated by line 2—2 of Fig. 1.

Fig. 3 is a horizontal section taken substantially on the line 3—3 of Fig. 2.

In the drawings above briefly described, the numeral 1 designates a hollow base having integral upwardly diverging hollow arms 2 and 3 whose upper ends are here shown closed by plates 4 and 5 respectively which carry bearings 6 for the usual horizontal shaft 7 which carries an appropriate rotary chopper 8. This chopper operates within a rotary chopping bowl 9 mounted on a tubular extension 10 which rises from the crotch between the arms 2 and 3. A vertical shaft 11 is positioned within the base 1 with its upper end connected with the bowl 9, while its lower end is mounted upon an appropriate bearing 12 preferably having antifriction balls. Within the arm 2 is an inclined shaft 13 which drives the shaft 11 from the shaft 7, the latter being rotated by any preferred means such as a belt 14 and tight and loose pulleys 15. Any suitable belt shifter (not shown) may be employed for shifting the belt 14 from the tight to the loose pulley and if desired this belt shifter may be mounted on the machine.

In the preferred form of my invention, the bottom plate 16 of the base 1 is detachably secured in place by cap screws or the like 17, giving access to the interior of said base for assembling the driving connections therein. At the center, the plate 16 carries the bearing 12 and immediately above this bearing, I have shown the shaft 11 equipped with a crown gear 18 meshing with a bevel pinion 19 on the lower end of the shaft 13, but it will be understood that other suitable means might be employed for establishing a driving connection between the two shafts 11 and 13. At the upper end of the shaft 13, I have shown a bevel gear 20 which meshes with a pin gear 21 on the shaft 7, a suitable casing 22 being provided over said pin gear. Here again, any other adequate driving connection could be employed between the two shafts 7 and 13. In all instances, however, I intend to confine the shaft 13 in one arm of the hollow base 1, to also confine the shaft 7 in said base, and to place all of the driving connections possible within the base or its arm to prevent any possible injury to the operator.

Any desired connection may be employed between the shaft 11 and the chopping bowl 9, but I have shown said shaft provided with a flat sided upper end 23 non-rotatably and removably received in a socket 24 which depends from the bowl into the tubular extension 10. The bowl 9 is also shown equipped with a depending annular flange 25 which rotatably surrounds the extension 10, ball bearings 26 being by preference interposed between the two. As shown, the shaft 11 supports the weight of the bowl 9 while the bearings 26 and flange 25 merely co-act with the extension 10 to prevent whipping of the shaft 7 and consequent lateral movement of the bowl, and the action of these parts if desired, may be augmented by a peripheral rib 27 formed on the upper edge of the bowl 9 and resting on shoulders 28 formed on the upper ends of the arms 2 and 3 as shown clearly in Fig. 1.

Over the chopper 8, I mount an arched hood 29 which is preferably formed integrally with the top plate 30 which may well be pivoted at 31 to an arm 32 rising from the standard 1, said arm being preferably connected to the arms 2 and 3 by horizontal arms 33 integral with the same. Within the hood 29 is the usual cleaning comb 34 for the chopper 8.

I prefer that the plate 30 on opposite sides of the hood 29 shall be arched at 35 over the shaft 7 to guard the latter, and said plate also guards the usual bowl cleaning knife 36, and fits down onto the bowl to prevent any means from coming through. The plate and hood however, may be swung upwardly for cleaning the machine as indicated by the dotted lines in Fig. 2.

I am aware that chopping machines have heretofore been devised employing a rotary bowl, a rotary chopper operating in said bowl, and means for rotating both said bowl and chopper in unison, and therefore lay no claim to this general arrangement of parts. However, I have greatly improved upon the general construction of the machine, particularly with reference to the base 1 provided with the diverging arms 2 and 3, the shaft 13 located in one of said arms, and the bowl driving shaft 11 mounted also in the base and connected with the bowl through the extension 10 which forms the bearing of the bowl 9.

Since good results may be obtained from the details disclosed, they may be followed if desired, but within the scope of the invention as claimed, considerable latitude is allowed for embodying the invention in numerous forms other than that shown.

I claim:

1. A chopping machine comprising a hollow base having a pair of upwardly diverging arms, at least one of which is hollow, said base having a vertical bearing extension in the crotch between said arms and being provided on its bottom with a bearing alined with said extension, horizontal bearings carried by the upper ends of said arms, a horizontal shaft rotatably mounted in said bearings and adapted to be driven, said shaft carrying a chopper, a vertical shaft within said hollow base mounted on said bearing at the bottom of said base, an oblique shaft within the hollow arm of said base, driving connections between said oblique shaft and said horizontal and vertical shafts, a chopping bowl between said upwardly diverging arms of said base receiving said chopper and connected with the upper end of said vertical shaft, and a bearing depending from said bowl and operating against said bearing extension of the base.

2. A chopping machine comprising a hollow base provided with a pair of upwardly diverging arms at least one of which is hollow, said base having an opening in its top in the crotch between said arms and being provided with a bearing on its bottom in vertical alinement with said opening, a vertical shaft supported by said bearing and extending through said opening, an oblique shaft mounted in said hollow arm and driving connections between said vertical and oblique shafts, a horizontal chopper carrying shaft mounted on the upper ends of said arms, driving connections between said horizontal shaft and said oblique shaft, and a chopping bowl receiving the chopper of said horizontal shaft, said bowl being received between said diverging arms and being connected with the upper ends of said vertical shaft.

3. A chopping machine comprising a hollow base having a pair of upwardly diverging arms at least one of which is hollow, said base having an opening in the crotch between said arms and being provided with a bearing on its bottom in vertical alinement with said opening, a vertical shaft supported on said bearing and extending through said opening, an oblique shaft in said hollow arm and driving connections between said oblique shaft and vertical shaft, a horizontal chopper carrying shaft rotatably supported by the upper ends of said arms and means for driving said oblique shaft from said horizontal shaft, a chopping bowl received between the upper ends of said diverging arms and rotatable bodily with said vertical shaft, a cleaning comb for the chopper of said horizontal shaft, and a third arm inclining rearwardly from said base and carrying said comb.

4. A chopping machine comprising a hollow base having a pair of upwardly diverging arms, at least one of which is hollow, said base having an opening in the crotch between said arms and being provided with a bearing on its bottom in vertical alinement with said opening, a vertical shaft rotatably supported by said bearing and extending through said opening, a chopping bowl between said upwardly diverging arms and connected axially with said vertical shaft, the periphery of said bowl being provided with an outstanding rib and the inner sides of said arms being equipped with shoulders upon which said rib rests slidably, a horizontal chopper carrying shaft rotatably mounted on the upper ends of said arms, and means in said hollow arm for transmitting motion from said horizontal shaft to said vertical shaft.

5. The combination with a supporting frame, a chopping bowl rotatably mounted on said frame, and a horizontal chopper carrying shaft mounted on said frame with its chopper positioned within said bowl, of a hinged cover plate for said bowl having arched portions extending over said shaft and its cutter, said plate and its arched portions being adapted to swing upwardly when cleaning the machine.

In testimony whereof I have hereunto set my hand.

MAX OEHLER.